United States Patent [19]
Melas et al.

[11] Patent Number: 5,559,840
[45] Date of Patent: Sep. 24, 1996

[54] DIGITAL TIMING RECOVERY METHOD AND APPARATUS FOR A CODED DATA CHANNEL

[75] Inventors: Constantin M. Melas, Los Gatos; Arvind M. Patel, San Jose; Robert A. Rutledge, San Jose; Bum S. So, San Jose, all of Calif.

[73] Assignee: Inernational Business Machines Corporation, Armonk, N.Y.

[21] Appl. No.: 312,727

[22] Filed: Sep. 27, 1994

[51] Int. Cl.⁶ .................................................. H04L 7/00
[52] U.S. Cl. ........................................................ 375/355
[58] Field of Search ................................. 375/371, 373, 375/355, 360; 371/43; 360/51

[56] References Cited

U.S. PATENT DOCUMENTS

| | | | |
|---|---|---|---|
| 4,945,538 | 7/1990 | Patel | 371/43 |
| 5,266,850 | 11/1993 | Au et al. | 307/511 |
| 5,267,267 | 11/1993 | Kazawa et al. | 375/371 X |
| 5,276,711 | 1/1994 | Rossi | 375/355 |
| 5,282,216 | 1/1994 | Patel et al. | 371/43 |
| 5,291,500 | 3/1994 | Patel et al. | 371/65 |
| 5,295,128 | 3/1994 | Hutchins et al. | 369/59 |

*Primary Examiner*—Stephen Chin
*Assistant Examiner*—Kevin Kim
*Attorney, Agent, or Firm*—Baker, Maxham, Jester & Meador

[57] ABSTRACT

A digital timing recovery circuit for rapid acquisition and synchronization of sampling clock phase in a data playback signal processing channel. The filtered playback signal in a (1,7)ML coded playback channel is sampled at the rate of one sample per bit window and the digitized sample values are processed with a (1,7)ML decoding procedure to produce decoded bits. A digital timing recovery circuit of this invention uses the digitized sample values directly to control the sampling clock phase by computing a digital phase error signal (PES) that is a constant function of phase error independent of data pattern. The PES depends only on the adjacent samples before and after a peak signal value. These "side-samples" contain maximal timing information because they occur at the steepest slope of the read-back signal and are thus most sensitive to clock phase error. Both side-samples of every pulse are weighted uniformly, independent of data pattern, thereby maximizing available phase information and ensuring the rapid acquisition and convergence of the sampling clock phase.

24 Claims, 6 Drawing Sheets

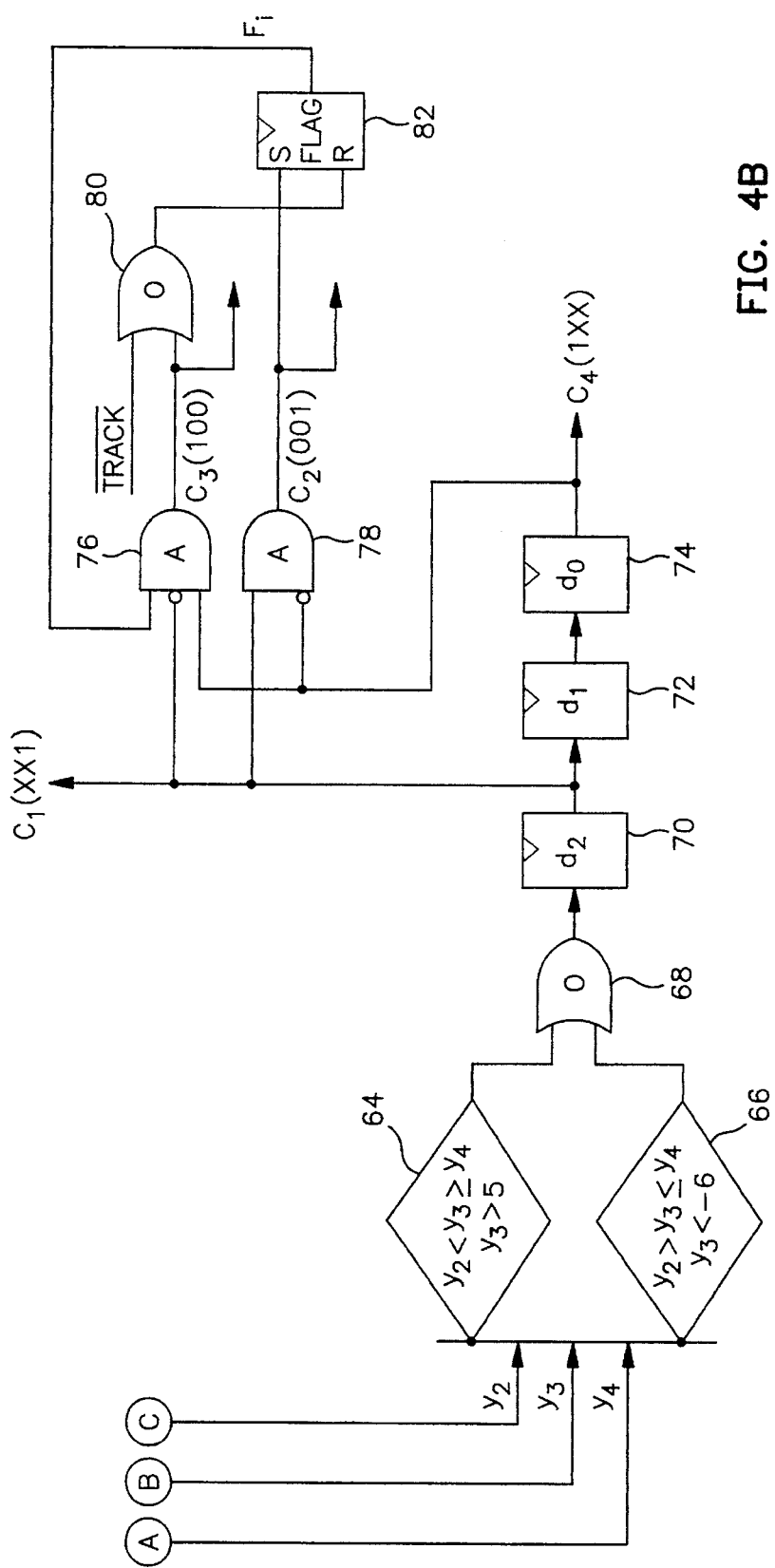

DIGITAL TIMING RECOVERY METHOD AND APPARATUS FOR A CODED DATA CHANNEL

BACKGROUND OF THE INVENTION

1. Field of the Invention

This invention relates generally to coded signal processing channels for converting an analog transducer signal into a series of digital signals corresponding to coded binary data and particularly to a digital timing recovery circuit for producing an instantaneous clock phase error signal in a (1,7)ML channel.

2. Discussion of the Related Art

A magnetic or optical data recording and playback channel is designed to accept data for storage and to later deliver the same on retrieval demand without errors or unreasonable access delay. Self-clocking modulation codes are employed to ensure an adequate minimum rate of signal transitions for clock synchronization during data retrieval without exceeding the maximum transition storage density of the magnetic or optical medium used to store the data. Such modulation codes include run-length-limiting (RLL) codes that represent a one-to-one mapping of binary data into a constrained binary sequence that is then recorded on the recording medium as a series of magnetic polarity reversals or optical "transitions".

Increases in medium recording density impose heavy demands on the playback signal detection process in a magnetic or optical recording channel. In commonly assigned U.S. Pat. No. 4,945,538, fully incorporated herein by this reference, Patel discloses a (1,7)ML sequence detector that employs a state-dependent sequence detection process to compute appropriate functional expressions of digital sample values over a detection window wider than the usual single-bit window employed in classical RLL decoders. Because Patel's (1,7)ML recovery process can be programmed to adjust decision thresholds, the threshold constants can be modified for different tracks or bands of tracks in a magnetic or optical disk file to optimize performance over every track in the file.

In commonly assigned U.S. Pat. Nos. 5,282,216 and 5,291,500, both fully incorporated herein by this reference, Patel et al. describe improvements to and extensions of Patel's (1,7)ML channel signal processing method. The improved channel includes an analog-to-digital converter (ADC) that receives a clock signal from a phase-locked loop (PLL) oscillator and accordingly produces digitized sample values of the analog playback signal at successive sample times. To eliminate clock phase error, unwanted differential delay between the channel clock signal and the self-clocking analog playback signal is removed by a discrete delay element that allows manual adjustment of delays in small increments.

In commonly assigned U.S. Pat. No. 5,266,850, fully incorporated herein by this reference, Au et al. disclose a method and circuitry for automatically adjusting the delay setting of the Patel et al. delay element to ensure phase synchronization of the clock signal with the analog signal at the ADC element of the channel. Although the Au et al. circuitry is quite practical for use in a constant data rate magnetic or optical storage device channel, the delay element must be frequently adjusted to a new setting for each zone in a constant density (Zone Band Recorded or ZBR) storage device. This requirement for continual resynchronization of the clock phase reduces the efficiency of the Au et al. Delay Trim circuitry, unfavorably affecting either the channel hardware design or the requisite track formatting process or both.

There is accordingly a clearly-felt need in the art for a more efficient timing recovery procedure suitable for application to ZBR device channels. In commonly-assigned U.S. Pat. No. 5,295,128, Hutchins et al., disclose a useful digital data clock control loop for reconstructing the asynchronous data clock in a ZBR or other data processing channel. Hutchins et al. disclose and claim a discrete clock control loop applied in a sampled data system in which phase adjustments are made on a recursively weighted moving sum of phase errors accumulated over several sample periods on the digital side of the loop. Although their continuing clock reconstruction process is well-suited to ZBR channels, Hutchins et al. consider an asynchronous clock and thus neither consider nor suggest any means for producing an instantaneous phase error correction signal for the direct phase adjustment of the synchronous waveform sampling means.

Although the methods and circuits described in the cited commonly-assigned U.S. patents operate satisfactorily, the unresolved problems and deficiencies associated with automatic clock delay trimming in a ZBR storage device channel are clearly felt in the art and are resolved by this invention in the manner described below.

SUMMARY OF THE INVENTION

The method and apparatus of this invention solves the ZBR clock synchronization problem by using a digital timing recovery method that directly employs the instantaneous ADC sample values for clock recovery. The apparatus of this invention replaces the analog PLL used in the above-cited Patel references with a continuously-corrected channel clock and thereby eliminates the need for the Delay Trim logic of Au et al.

It is an object of the method of this invention to rapidly provide an accurate clock phase error correction signal (PES) in a data processing channel. It is a feature of the method of this invention that the PES values are immediately produced from the instantaneous signal samples immediately preceding and following a signal peak, thereby providing optimal sensitivity to instantaneous clock phase error.

It is another object of the method of this invention to provide a PES with accuracy that is independent of channel data patterns. It is an advantage of the method of this invention that the average PES value is a fixed function of instantaneous clock phase error and is independent of data pattern even for asymmetric pulse shapes because only the side-samples at a pulse peak are used to produce the PES.

It is yet another object of the method of this invention to provide rapid convergence of the channel sampling clock phase. It is a feature of the method of this invention that both side-samples of every playback signal extremum are used uniformly and independently of data pattern, thereby providing the maximum possible correction available from clock phase information. The preferred embodiment of the PES method of this invention offers minimal loop delay and provides for rapid locking to a high-frequency preamble data pattern independent of initial clock phase error.

The foregoing, together with other objects, features and advantages of this invention, can be better appreciated with reference to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 4, comprising FIGS. 4A–4B, is a functional block diagram showing an exemplary embodiment of the phase error generation logic of this invention;

DETAILED DESCRIPTION OF THE PREFERRED EMBODIMENTS

Figure 1:
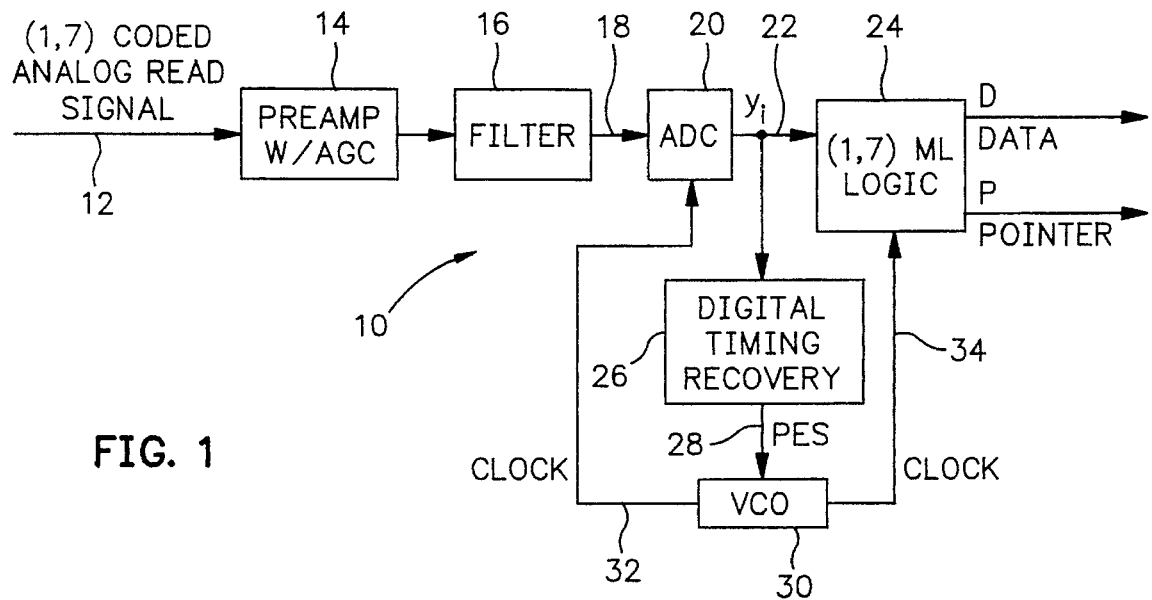
FIG. 1 is a functional block diagram showing an illustrative embodiment of a (1,7)ML signal processing channel incorporating the digital timing recovery system of this invention.

FIG. 1 illustrates the (1,7)ML read or playback channel 10 described in the above-cited Patel and Patel et al. references, improved according to this invention. The (1,7)ML coded analog read signal is produced at line 12 by a magnetic or optical sensor in a well-known manner. Analog signal 12 is first conditioned in a preamplifier 14 and then filtered in a filter 16 in the usual manner. The filtered analog signal 18 is sampled at the rate of one sample per bit window in the analog-to-digital converter (ADC) 20 to produce a series of analog sample values $\{S_i\}$. These analog samples are then digitized to create a series of digital signals $\{y_i\}$. The digitized sample values $\{y_i\}$ are coupled through bus 22 to the (1,7)ML logic 24, which is described fully in the above-cited Patel and Patel et al. references incorporated herein.

According to this invention, the digital timing recovery circuit 26 accepts digital signals $\{y_i\}$ from bus 22 and extracts a digital clock Phase Error Signal (PES), which is forwarded on the PES bus 28 to a channel clock 30. Channel clock 30 includes all circuitry necessary for converting the digital PES on PES bus 28 to a clock phase, including a voltage-controlled oscillator (VCO). The channel clock signal from channel clock 30 is coupled on line 32 back to ADC 20 and on line 34 to (1,7)ML logic 24. The process of this invention for producing the PES on bus 28 in digital timing recovery circuit 26 is now described.

Figure 2:
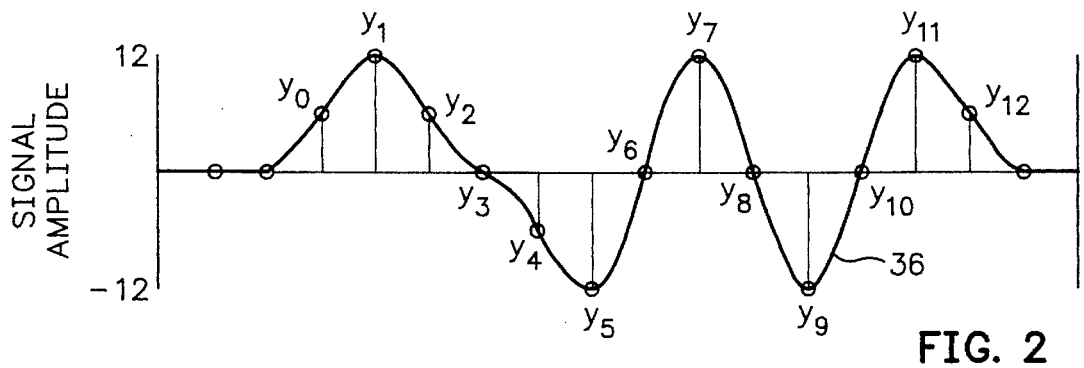
FIG. 2 shows an illustrative playback signal waveform with digital sample values in a channel having a synchronized sampling clock with no phase error.
Figure 3:
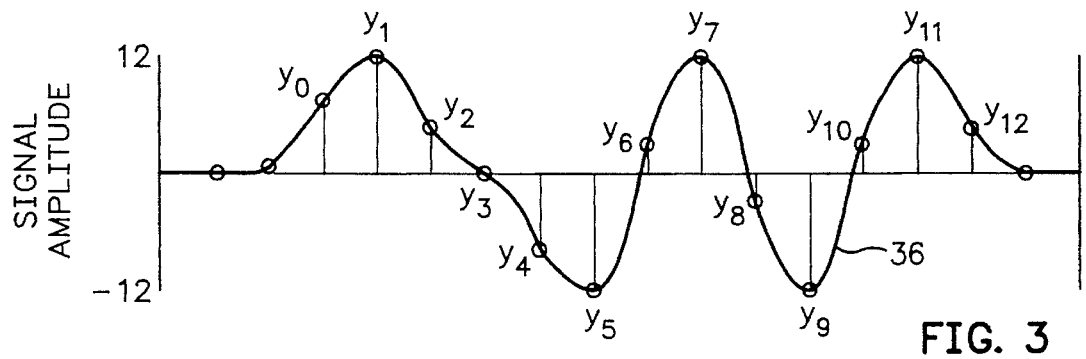
FIG. 3 shows the playback signal waveform of FIG. 2 with digital sample values in a channel having a late sampling clock with positive phase error.

FIG. 2 shows an exemplary analog playback signal waveform 36 labelled with the digital sample values $\{y_i\}$ corresponding to the analog samples $\{S_i\}$ as they are located when the channel clock phase is properly synchronized with the self-clocking analog playback waveform 36. FIG. 3 shows the same exemplary analog signal waveform 36 labelled with the digital sample signals $\{y_i\}$ corresponding to the analog samples $\{S_i\}$ as they are located when the channel sampling clock is late (positive phase error). The process of this invention produces a PES value for each extremum (upper or lower peak) in analog signal waveform 36. One of three different types of PES values is produced for each extremum in waveform 36 and the type depends on the location of adjacent extrema. These three PES types are herein denominated (a) the isolated peak type, (b) the zero-crossing type, and (c) the multiple adjacent peak type. The three types represent three distinct analog waveform conditions.

Referring to FIGS. 2 and 3, waveform 36 exhibits an isolated peak at sample $y_1$, illustrating the first condition. The side-sample $y_0$ and $y_2$ are of equal amplitude when the channel clock is phase-synchronized with waveform 36, as shown in FIG. 2. When the channel clock is late, as in FIG. 3, then digital signal $y_0$ is greater than digital signal $y_2$ if the single peak at $y_1$ is positive. For negative isolated peaks, the succeeding side-sample is greater than the preceding side-sample for a late channel clock signal (positive phase error). Similarly, if the channel clock signal is early (negative phase error), then digital signal $y_2$ must be greater than digital signal $y_0$ for positive isolated peaks. This side-sample relationship is, of course, inverted for negative isolated peaks with early channel clock signals. Accordingly, the "isolated peak" type of PES can be formally written as:

$$e_i = (y_{i-1} - y_{i+1}) * \text{sign}(y_i) \quad [\text{PES for an isolated peak at } y_i] \quad [\text{Eqn. 1}]$$

The zero-crossing condition is shown in FIGS. 2 and 3 at sample $y_6$, which is the zero-crossing between the two adjacent peaks of opposing polarity at $y_5$ and $y_7$. When the channel clock is phase-synchronized to waveform 36, the value of digital signal $y_6$ is zero. If the peak at $y_7$ is positive, then the zero-crossing sample at $y_6$ is positive for a late channel clock signal (positive phase error) and negative for an early channel clock signal (negative phase error). Conversely, if the peak at sample $y_7$ is negative, then the zero-crossing sample at $y_6$ is negative for a late channel clock signal and positive for an early channel clock signal. Accordingly, the "zero-crossing" type of PES can be formally written as:

$$e_i = (y_i) \, \text{sign}(y_{i+1}) \quad [\text{PES for adjacent peaks at } y_{i-1} \text{ and } y_{i+1}] [\text{Eqn. 2}]$$

Waveform 36 in FIGS. 2 and 3 also shows a string of several adjacent peaks at $y_5$, $y_7$, $y_9$, and $y_{11}$, illustrating the third multiple adjacent peak waveform condition. This string of adjacent peaks is bracketed by a preceding side-sample at $y_4$ and a succeeding side-sample at $y_{12}$. These two side-samples $y_4$ and $y_{12}$ contain phase information that is not available when using either Eqn. 1 or 2 above. In FIG. 2, where the channel clock is properly phase-synchronized to waveform 36 (no phase error), the side-samples $y_4$ and $y_{12}$ have equal absolute values but may differ in sign depending on the number of adjacent peaks in the intervening string. If the channel clock is late (positive phase error), then $y_4$ is greater than $y_{12}$ in absolute value and, conversely, if the channel clock is early (negative phase error) then digital signal $y_4$ is less than digital signal $y_{12}$ in absolute value. Accordingly, the "multiple adjacent peak" type of PES may be formally written as:

$$e_i = y_{i-1} \text{sign}(y_i) - y_{i+2n+1} \text{sign}(y_{i+2n}) \quad [\text{PES for peaks at } y_i, y_{i+2}, \ldots y_{i+2n}] \quad [\text{Eqn. 3}]$$

Note that Eqn. 3 reduces to Eqn. 1 when n=0. The expressions for $e_i$ in Eqns. 1–3 require knowledge of the precise locations of the analog signal extrema. Although precise analog signal extrema locations can be reliably obtained from the output of (1,7)ML logic 24, such information is substantially delayed because of the internal processing loop delay in logic 24. This internal loop delay is very disadvantageous when added to the timing recovery loop delay. The process of this invention instead advantageously extracts analog signal peak location information directly from the digital signals $\{y_i\}$ at bus 22, thereby avoiding all internal delays associated with logic 24. A simple three-sample digital detector is used to generate a digital detector code $d_i$ for each group of three adjacent digital signal samples $(y_{i-1}, y_i, y_{i+1})$ according to the following Boolean logic expression:

$$d_i = (y_i > y_{i-1})(y_i \geq y_{i+1})(y_i > k_+) + (y_i < y_{i-1})(y_i \leq y_{i+1})(y_i < k_-) \quad \text{[Eqn. 4]}$$

The values of $k_+$ and $k_-$ in Eqn. 4 are adjustable threshold parameters. Generally, $|k|$ is substantially midway between 0 and the minimal sample value for the positive or negative extremum (peak) in the waveform. The digital detector code $d_i$ is "1" when the expression is "true" and "0" otherwise.

The formal expressions in Eqns. 1–4 may be combined to create a channel clock phase error signal (PES) output responsive to each group of three sequential digital detector codes $(d_{i-1}, d_i, d_{i+1})$ as shown in Table 1 below.

TABLE 1

| $d_{i-1}$ | $d_i$ | $d_{i+1}$ | $F_i$ | Hold = $H_i$ | PES = $e_i$ |
|---|---|---|---|---|---|
| 1 | 0 | 1 | x | x | $y_i * \text{sign}(y_{i+1})$ |
| 0 | 0 | 1 | 1 | $y_i * \text{sign}(y_{i+1})$ | 0 |
| 1 | 0 | 0 | 0 | 0 | $F_{i-1}(H_{i-1} - y_i * \text{sign}(y_{i-1}))$ |

The first row of Table 1 provides the zero-crossing PES from Eqn. 2, which is produced whenever two adjacent analog extrema are detected. The second and third rows in Table 1 together implement both the isolated-peak PES from Eqn. 1 and the multiple adjacent peak PES from Eqn. 3. When a detector code sequence $(d_{i-1}, d_i, d_{i+1})=(0,0,1)$ is detected, a flag $F_i$ is set to unity and the partial PES value from Eqns. 1 or 3 is stored in a holding register as $H_i$. When a detector code sequence (1,0,0) is detected, the PES value from Eqn. 3 is produced as a combination of the present sample $y_i$, the preceding sample $y_{i-1}$, the preceding hold register value $H_{i-1}$ and the preceding flag value $F_{i-1}$. The flag $F_i$ is then reset to zero as are the contents of the hold register $H_i$. All occurrences of detector code sequence (1,0,1) continue to produce the PES noted in row 1 of Table 1 during the intervening period between the occurrence of (0,0,1) and (1,0,0).

For instance, when an isolated pulse occurs at $y_j$, corresponding to a detector code sequence of (0,0,1,0,0), the first triplet (0,0,1) is detected at time $i=j-1$, producing the hold value $H_i=y_{j-1}*\text{sign}(y_j)$ for storage in the holding register and setting $F_i=1$. Two cycles later, at time $i=j+1$, a detector code sequence (1,0,0) is detected and the PES from Eqn. 1 of $e_j=(y_{j-1}-y_{j+1})*\text{sign}(y_j)$ is produced according to the third row of Table 1.

As another example, consider a string of two or more adjacent extrema, such as represented by a detector code sequence of (0,0,1,0,1,0,1,0,0). The first side-sample preceding the string is held in the holding register with the appropriate sign until the end of the string is reached. Then the final side-sample (with appropriate sign) is subtracted from the holding register value and the result is produced as a PES according to Eqn. 3. Note that a stream of intervening PESs according to Eqn. 2 are also produced during the period between beginning and end of the string.

If the H value in the holding register is held too long before release, it may become so outdated that it no longer represents a useful sampling of actual phase error when it is released. Moreover, if the holding register is an analog sample-and-hold register instead of the preferred digital signal storage register, the accuracy of the held value may deteriorate over time. For these reasons, it is desirable to limit the hold time of the holding register in an alternative PES generation process. This holding time can be limited by limiting the length of adjacent peak strings in the analog playback signal. One way to accomplish this is by rearranging the PES procedure to exploit the (1,7) run-length-limited (RLL) code constraint. The side-samples may be compared on either side of a string of zeros instead of, as above, on either side of a string of peaks. Making this change guarantees that the value held in register $H_i$ must be released in no more than six clock cycles because no more than seven adjacent zeros are permitted under the (1,7) RLL constraint and examining this longest string (1,0,0,0,0,0,0,0,1) in triplets requires only six steps between the first detector code sequence (1,0,0) and the last detector code sequence of (0,0,1).

For example, referring to FIG. 3, this alternative process selects side-samples $y_2$ and $y_4$ for a zero-crossing at $y_3$ instead of selecting the side-samples of $y_0$ and $y_2$ for a peak at sample $y_1$. With this change, the PES from Eqns. 1 and 3 above is rewritten as:

$$e_i = y_{i+n} * \text{sign}(y_{i+n+1}) - y_i * \text{sign}(y_{i-1}) \text{ [PES for peak at } y_{i-1} \text{ with the next peak at } y_{i+n+1}] \quad \text{[Eqn. 5]}$$

This alternative hold-time limiting process for producing PES values is summarized below in Table 2, which may be completely understood by analogy to the above Table 1.

TABLE 2

| $d_{i-1}$ | $d_i$ | $d_{i+1}$ | $F_i$ | Hold = $H_i$ | PES = $e_i$ |
|---|---|---|---|---|---|
| 1 | 0 | 1 | x | x | $y_i * \text{sign}(y_{i+1})$ |
| 1 | 0 | 0 | 1 | $y_i * \text{sign}(y_{i-1})$ | 0 |
| 0 | 0 | 1 | 0 | 0 | $F_{i-1}(y_i * \text{sign}(y_{i+1}) - H_{i-1})$ |

The hold-and-release feature of the process of this invention optimizes the timing recovery because all available phase information is used to create the PES, thereby avoiding any dependency on data pattern. The disadvantage of this optimal technique is the requirement for substantial hardware to implement the holding register and associated logic. In some situations, it may be advantageous to eliminate the hold-and-release feature to reduce hardware costs at the expense of some minor loss of optimality in timing recovery. This can be accomplished simply by eliminating the "multiple adjacent peak" type PES values from Eqn. 3 (or Eqn. 5) and producing only PES values from Eqns. 1 and 2. The simplified rules summarized in Table 3 below can be used to implement Eqns. 1 and 2, for example.

TABLE 3

| $d_{i-1}$ | $d_i$ | $d_{i+1}$ | $F_i$ | PES = $e_i$ |
|---|---|---|---|---|
| 1 | 0 | 1 | 0 | $y_i * \text{sign}(y_{i+1})$ |
| 0 | 0 | 1 | 1 | 0 |
| 1 | 0 | 0 | 0 | $F_{i-1}(y_{i-2} - y_i) * \text{sign}(y_{i-1})$ |

Referring to Table 3, a PES according to Eqns. 1 or 2 is produced after every analog signal peak except when the digital detector code pattern is equal to (1,0,1,0,0), for which case there is a PES produced according to Eqn. 2 after the first peak but no PES after the second peak. Thus, there is at least one PES value produced for every two successive peaks.

Figure 7:
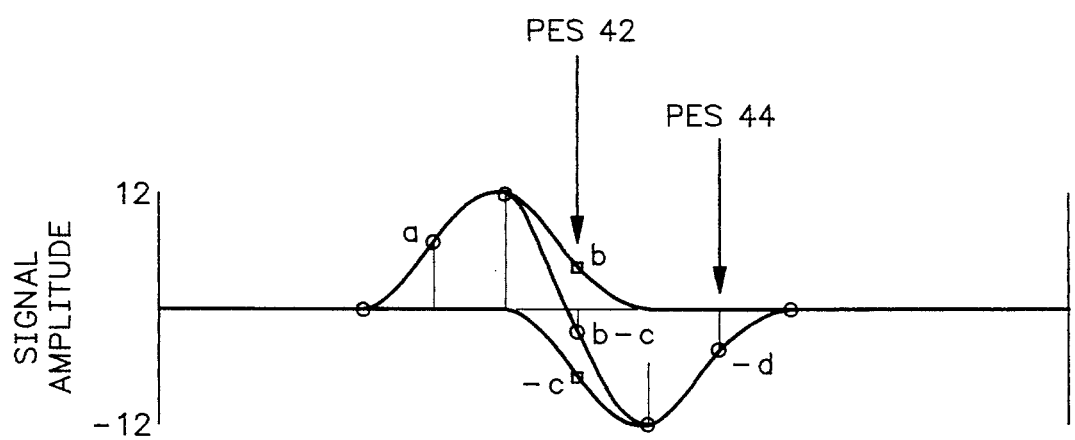
FIG. 7 shows exemplary phase error signals (PES) produced for two adjacent playback signal waveform pulses.

The timing recovery procedures discussed above in connection with Tables 1 and 2 guarantee that there is one PES for every positive and negative extremum in the analog playback signal and also guarantee that the average PES is independent of the playback data pattern. This independence can be understood by considering that each PES is equivalent to the difference between the preceding and succeeding side-samples of an isolated extremum. For instance, a sample between adjacent peaks, such as $y_6$ in FIG. 3, automatically performs the subtraction by linear superposition in the analog playback signal. FIG. 7 shows the two adjacent PES values for two adjacent pulses and the PES 42 is equal to (c–b) and the PES 44 is equal to (a–d). For every positive or negative waveform extremum, both side-samples are used to extract timing information, which maximizes the use of all available timing information and eliminates any possibility of data pattern sensitivity. In the following discussion, the method of Table 1 is considered.

Figure 6:
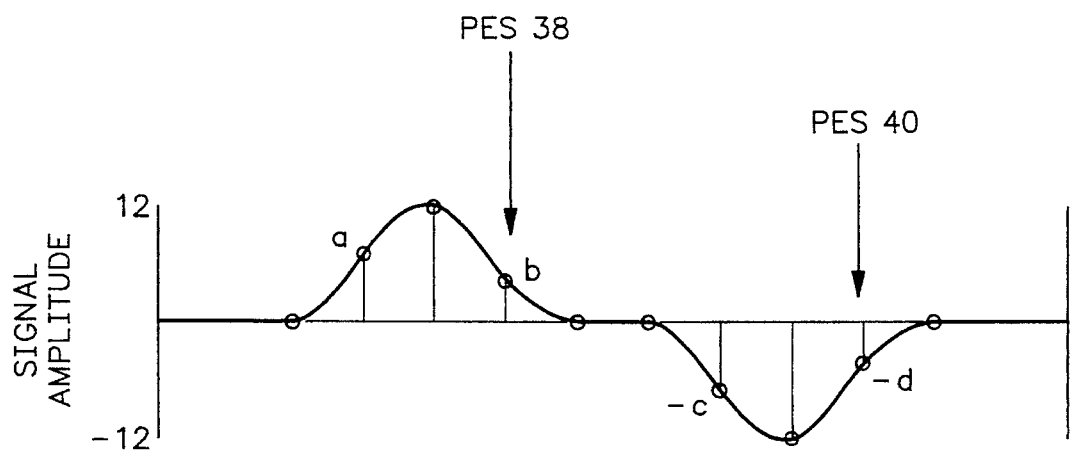
FIG. 6 shows exemplary phase error signals (PES) produced for two successive isolated playback signal waveform pulses.

FIG. 6 shows the PES values for two adjacent pulses. The PES 38 value for the first pulse is equal to (a–b) and the PES 40 value for the second pulse is equal to (c–d). If the first positive pulse is the mirror image of the second negative pulse, then a=c and b=d and both PES 38 and PES 40 are equal to (a–b). In general, however, each pulse is nonsymmetric and PES 38 is not equal to PES 40. Nevertheless, the average of any two successive PES values is always equal to (a–b+c–d)/2. For some data patterns, such as (0,0,1,0,0,1, 0,1,0), a temporary imbalance may occur in that the average of two successive PES values shifts between (2a–b–d)/2 and (2c–b–d)/2. No other average PES values are possible.

Thus, data pattern independence is always guaranteed over any number of successive PES pairs and the inventors have shown that, for any data pattern, the average of 2n successive PES $e_i$ values (ignoring any phase corrections) satisfies the following relationship:

$$\frac{1}{2n}\sum_{i=1}^{i=2n} e_i = \frac{a+c-b-d}{2} + \epsilon \text{ where } |\epsilon| \leq \frac{|a-c|}{2n} \quad \text{[Eqn. 6]}$$

The limiting condition of Eqn. 6 can be demonstrated for the PES generating process described above in Table 1 by evaluating every possible permutation of PES pairs. This condition shows that the PES is substantially independent of data pattern and also shows that the channel clock phase converges to a unique state where (a–b+c–d)=0.

The PES process of Table 2 does not even permit that minor variation in the average PES value shown in Eqn. 6. The PES at time i is equal to (a–d) if there occurs a positive peak at $y_{i+1}$, and is equal to (c–b) if there is a negative peak at $y_{i+1}$. Therefore, for any two successive PES values, $e_i$ and $e_{i+1}$, satisfy the even stronger condition of Eqn. 7 below:

$$e_i + e_{i+1} = a + c - b - d \quad \text{[Eqn. 7]}$$

The PES process of Table 3, while saving hardware, permits slightly more variation in the average PES value for asymmetric pulses. For example, a repeating pattern of the form (+1,0,–1,0,0,+1,0,–1,0,0 . . . ) forces every PES value to (c–b) and must settle at a phase value where c=b. Alternatively, a repeating pattern of the form (–1,0,+1,0,0, –1,0,±1,0,0, . . . ) forces every PES value to (a–d) and must settle at the phase where a=d.

Figure 4A:
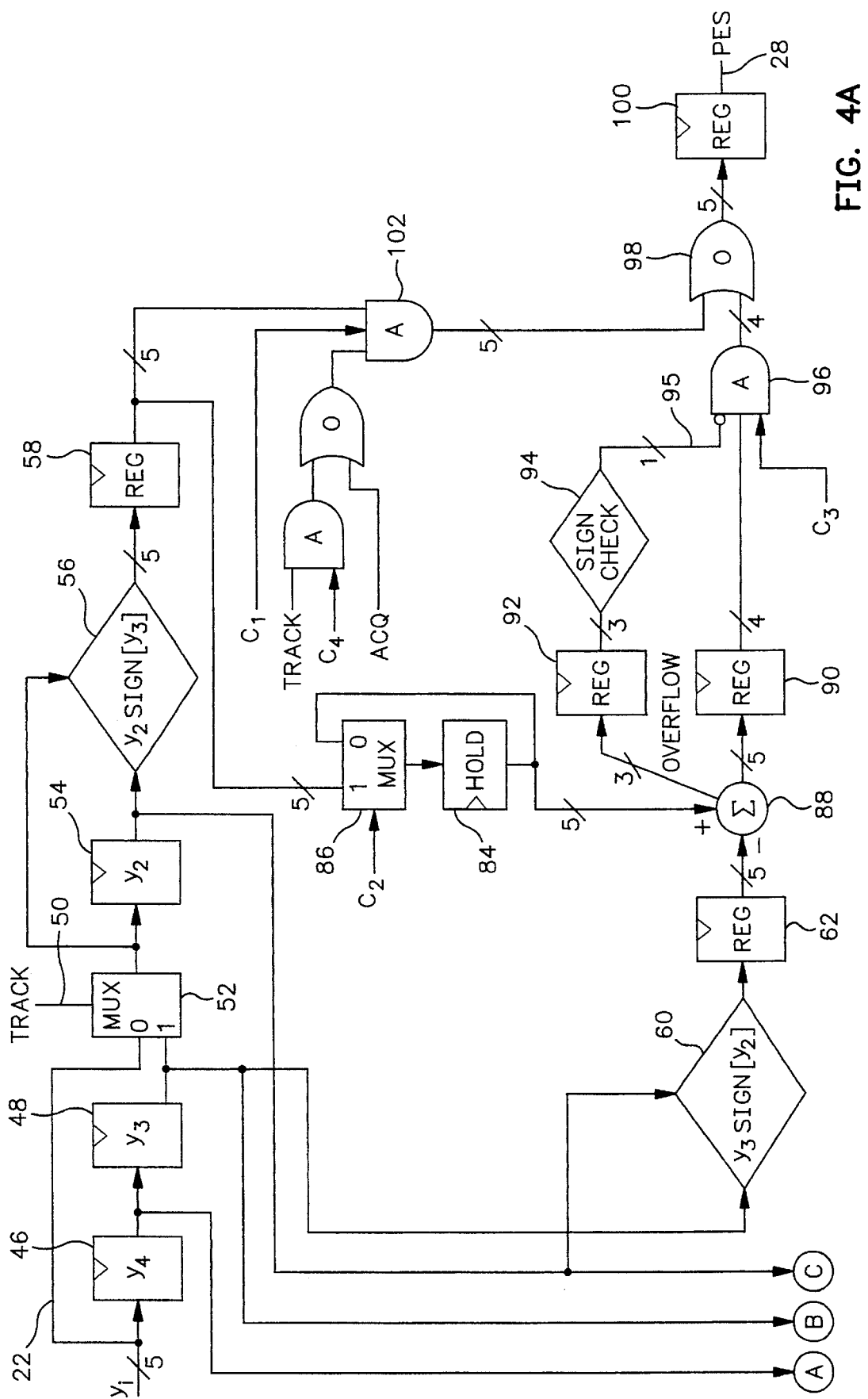

FIG. 4, comprising FIGS. 4A–4B, shows a functional block diagram of an exemplary embodiment of the phase error generation logic for implementing the process of this invention summarized in Table 1. Referring to FIG. 4A, the digital signals $\{y_i\}$ are presented at bus 22 as 5-bit words. The most recent digital signal $y_4$ is stored at a register 46 for the duration of one channel clock cycle. Upon the next clock cycle, the digital signal in $y_4$ register 46 is transferred to the $y_3$ register 48. If the tracking-mode signal on line 50 is "1" (enabled), then the multiplexer 52 transfers the contents of register 48 to the next register 54 upon the next clock cycle. If the tracking mode is disabled, MUX instead transfers the most recent digital signal $y_i$ from bus 22 to register 54 to reduce delay for fast clock acquisition. During the acquisition mode, the PES is derived from a 2T data pattern (1,0,1,0,1,0,1,0,1 . . . ) that is written in a preamble to each data storage sector. Using a known pattern permits the use of the faster logic path to minimize loop delay and the 2T pattern provides for the minimum possible acquisition time.

The logic 56 produces the PES according to Eqn. 2 or the first part of Eqns. 1 and 3, which is then stored in register 58 at the next clock cycle. Similarly, the logic 60 computes the second part of the PES according to Eqns. 1 and 3 and stores it in register 62 at the next clock cycle. Thus, register 58 holds $y_1 * \text{sign}(y_2)$ and register 62 holds $y_2 * \text{sign}(y_1)$ according to the subscript convention of FIGS. 4 and 5.

Referring to FIG. 4B, the three adjacent digital signals $y_2$, $y_3$ and $y_4$ are taken from registers 54, 48 and 46, respectively, and presented to the positive detector logic 64 and negative detector logic 66. Logic 64 tests for a peak at $y_3$ that exceeds a predetermined threshold value of $k_+ = 5$ and logic 66 tests for a negative peak at $y_3$ that falls below a predetermined threshold of $k_- = 6$.

The outputs of positive detector logic 64 and negative detector logic 66 are ORed together at the OR-gate 68, the output of which is transferred to the register 70 at the next clock cycle. Register 70 contains a 1-bit value for detector code $d_2$, which is unity if an extremum is found in the analog waveform close to the analog signal sample $S_2$ represented by digital signal $y_2$, according to the subscript convention in FIGS. 4 and 5. At each clock pulse, the contents of register 70 are transferred forward to register 72, which contains digital code $d_1$ and therefrom to register 74, which contains digital code $d_0$.

The remaining logic in FIG. 4B is summarized below in Table 4.

TABLE 4

| If True | $d_0$ | $d_1$ | $d_2$ |
|---|---|---|---|
| $C_1$ | x | x | 1 |
| $C_2$ | 0 | 0 | 1 |
| $C_3$ | 1 | 0 | 0 |
| $C_4$ | 1 | x | x |

Referring to Table 4 and to FIG. 4B, the 1-bit signal $C_1$ is equal to $d_2$ and represents a detector code sequence ($d_0$, $d_1$, $d_2$)=(x, x, 1), as may be appreciated with reference to Table 4. Similarly, because $C_4$ is merely the output of register 74, it represents $d_0$ and represents a detector code sequence of (1, x, x). The two 1-bit signals, $C_1$ and $C_4$, are combined through the AND-gates 76 and 78 to produce the two additional 1-bit signals, $C_2$ and $C_3$, substantially as specified in Table 4. The OR-gate 80 resets the flag register 82 to "0" when $C_3=1$ or when the phase error logic is in "acquisition" mode and not in "tracking" mode. This forces $C_3=0$ because $F_i=0$ and is returned to an input of AND-gate 76. When $C_2=1$, flag register 82 is set to Fi=1, which enables AND-gate 76 until the next detection of digital code sequence (1,x,0). Flag register 82 produces the flag discussed above in connection with Tables 1–3, which is first set responsive to $C_2=1$ for a detector code sequence of (0,0,1) and is then reset after $C_3=1$ for a detector code sequence of (1,0,0).

Returning to FIG. 4A, the contents of register 58 are transferred to the hold register 84 through the multiplexer 86 whenever $C_2=1$, which occurs whenever the digital detector code sequence is $(d_0, d_1, d_2)=(0,0,1)$. Thus, $H_i=y_i*\text{sign}(y_{i+1})$, which corresponds to the condition in row 2 of Table 1 hereinabove. If $C_2=0$, then the contents of hold register 84 are recycled through MUX 86 at each clock cycle and reentered so that $H_i=H_{i-1}$. Thus, according to the subscript convention of FIGS. 4 and 5, the value of hold register 84 is $H_0=y_0^* \text{sign}(y_1)$, from which is subtracted $y_2^*\text{sign}(y_1)$ from register 62 at the subtracter 88. The result is transferred to the register 90 after stripping the second most-significant-bit (MSB) from the difference. The stripped 2nd MSB essentially ignores all phase errors greater than three bits in magnitude.

The signs of both inputs to subtracter 88 and the sign of the result are transferred to the 3-bit register 92. These three bits are examined in the sign check logic 94 for an overflow condition and an "overflow-inhibit" bit is produced on line 95 responsive to the detection of an overflow condition in subtracter 88. Inhibit bit 95 blocks the transfer of the results through the 5-level AND-gate 96.

Upon detection of a detector code sequence of (1,0,0), $C_3$ goes to "1", enabling AND-gate 96, which transfers the result from register 90 through to the 5-level OR-gate 98 and therefrom to the PES output register 100. After the result in register 90 is transferred through AND-gate 96, $C_3$ is immediately reset to "0" responsive to resetting of flag multivibrator 82 in FIG. 4B. Thus, the output of AND-gate 96 represents the PES value from the third row of Table 1 hereinabove. Similarly, the output from the 5-level AND-gate 102 represents the PES value from the first row of Table 1 hereinabove, which is enabled whenever both $C_1$ and $C_4$ go high to signal detection of a detector code sequence (1, x, 1), which must be (1,0,1). This output from AND-gate 102 is disabled when the logic is neither in acquisition mode nor in tracking mode or when it is not in acquisition mode and $C_4=0$.

Figure 5A:
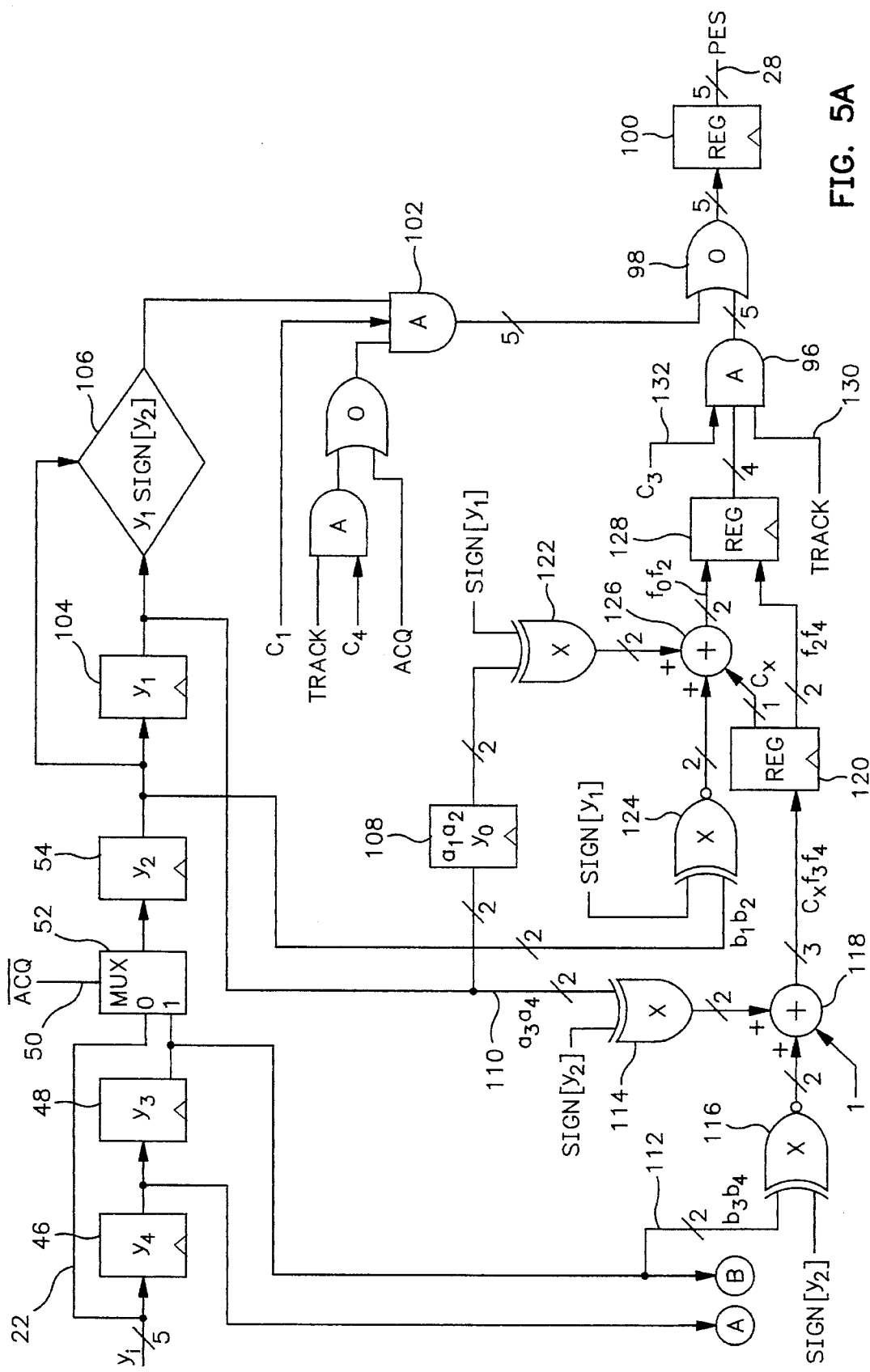
FIGS. 5A–5B, is a functional block diagram showing a second exemplary embodiment of the phase error generation logic of this invention.
Figures 5, 5A, 5B:
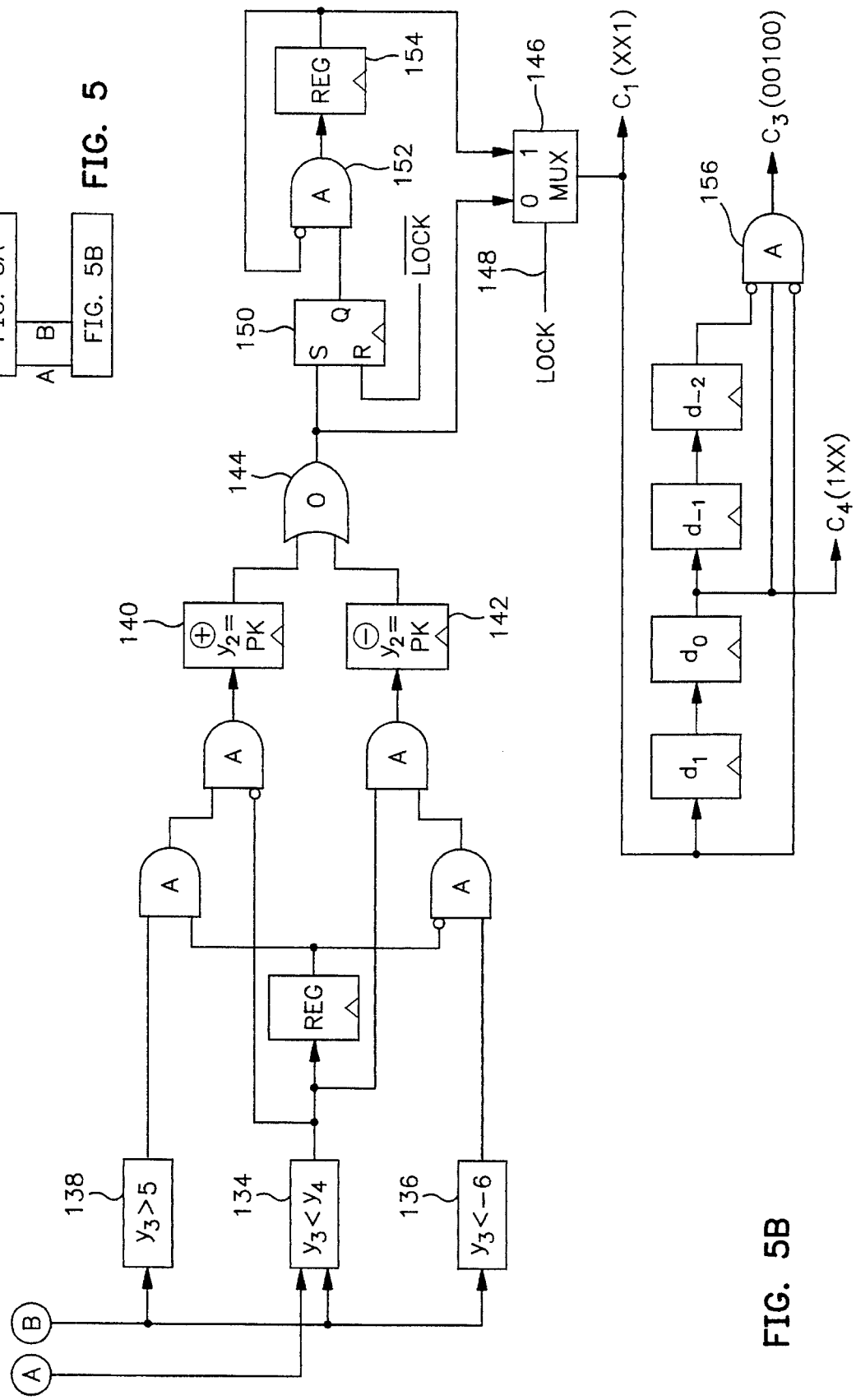
FIG. 5, comprising

FIG. 5, comprising FIGS. 5A–5B, shows a functional block diagram of an exemplary embodiment of the phase error generation logic necessary to implement the rules shown in Table 3. Referring to FIG. 5A, many of the elements are similar to those discussed above in connection with FIG. 4. Wherever elements are identical in form and function, the same numerals are used in both FIGS. 4 and 5. The circuitry in FIG. 5 embodies the phase error correction process discussed above in connection with Table 3, wherein no hold register 84 is necessary. The $y_2$ contents of register 54 are forwarded to register 104 during the next clock cycle. The logic 106 then produces $y_1*\text{sign}(y_2)$ and presents it to the 5-level AND-gate 102. This value from logic 106 represents the PES from the first line of Table 3 and is logically enabled at 5-level AND-gate 102 in the same manner discussed above in connection with FIG. 4A; that is, upon detection of the detector code sequence (1,x,1), which must be (1,0,1).

The $y_1$ contents of register 104 are split into half-words and the most-significant half-word (without the MSB) is transferred to register 108 on the next clock cycle. The two LSBs ($a_3a_4$) are split off into bus 110. Similarly, the two LSBs from ($b_3b_4$) of $y_3$ from register 48 are split off onto the bus 112. These two LSB pairs and the $y_2$ sign bit from register 54 are coupled through a half-adder made up of the two 2-layer XOR-gates 114 and 116 and the summer 118. Summer 118 provides a 3-bit output to register 120 that represents the least-significant portion of the term $(y_1-y_3)\text{sign}(y_2)$. This computation is split and processed by two half-adders operating one clock cycle apart because of the requirement for speed. The second half-adder includes the 2-level XOR-gates 122 and 124 together with the second summer 126. The output of summer 126 is the most-significant portion of the term. The two portions are forwarded to register 128, where they are reassembled into a single PES value that is the PES term from the third row of Table 3 hereinabove and is expressed as $(y_{-1}-y_1)*\text{sign}(y_0)$ using the subscript convention of FIGS. 4 and 5 herein.

The PES from register 128 is next forwarded to 5-level AND-gate 96, which is enabled in the tracking mode by the signal on line 130 and by $C_3=1$ on line 132, as discussed above in connection with FIG. 4A. A detector code sequence of (0,0,1,0,0) is the only condition necessary to output the PES from register 128 and no actual flag is needed. This eliminates the flag register hardware along with the hold register hardware.

Referring to FIG. 5B, the $y_3$ signal from register 48 and the $y_4$ signal from register 46 are presented to the three simple logic circuits 134, 136 and 138. The purpose of the circuitry in FIG. 5B in the lock mode is to simply detect a single peak and then settle in as if the detected peak is the first of a series of peaks in a 2T (1,0,1,0,1,0, . . . ) preamble data pattern. The outputs of comparison logic 134, 136 and 138 are processed through several AND-gates as shown. If a positive signal peak is detected, a "1" bit is stored in register 140. Similarly, if a negative signal peak is detected, a "1" bit is stored in register 142. If either registers 140 or 142 contains a "1", a "1" output from the OR-gate 144 is forwarded to the "0" port of the multiplexer 146. If the lock mode signal on line 148 is "0", then multivibrator 150 is reset and the OR-gate 144 output bit is transferred to the remainder of the circuit as $C_1$. If the lock signal on line 148 is "1", then the multivibrator 150 is set by the output of OR-gate 144, which initiates creation of a 2T (1,0,1,0 . . . ) pattern by operation of the AND-gate 152 and register 154. This pattern is transferred through MUX 146 and therefrom to the four digital detector code registers ($d_1, d_0, d_{-1}, d_{-2}$). When the first analog signal extremum ($d_i=1$) is detected, a latch locks in future values so that $d_{i+2}$ is equal to $d_i$, thereby ensuring that the channel clock converges in one direction only and does not hang up 180 degrees out of phase. The lock mode signal informs the circuit that the incoming data stream is from a sector preamble and may be ignored in favor of a locally-created 2T signal.

Finally, the AND-gate 156 operates on the contents of the four digital detector code registers to create the $C_3$ signal bit corresponding to a detector code sequence of (0,0,1,0,0). The $C_4$ signal bit merely represents the value of the $d_0$ detector code, as may be appreciated from FIG. 5B and Table 4 hereinabove.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. In a signal processing channel for recovering coded binary data from an analog signal having extrema, said channel having clock means for generating a channel clock signal and sampling means for sampling said analog signal to produce a plurality of sequential signal samples $\{S_i\}$ responsive to said channel clock signal, wherein i is an integer, a method for phase-synchronizing said channel clock signal to said analog signal, said method comprising the steps of:

(a) producing a multiplicity of digital signals $\{y_i\}$ representing said sequential signal samples $\{S_i\}$;

b) encoding a predetermined number of said digital signals $\{y_i\}$ to produce a digital detector code $d_i$ having one of at least two values representing whether or not an extremum occurs in said analog signal near the signal sample $S_i$ corresponding to said each digital signal $y_i$;

(c) producing a digital clock phase error signal (PES) $e_i$ in response to each sequence of three adjacent said detector codes $(d_{i-1}, d_i, d_{i+1})$; and (d) adjusting said channel clock signal phase responsive to said digital clock PES $e_i$.

2. The method of claim 1 wherein said encoding step (b) comprises the steps of:

(b.1) acquiring the preceding said digital signal $y_{i-1}$ and the succeeding said digital signal $y_{i+1}$ for said each digital signal $y_i$;

(b.2) if $(y_i > y_{i-1})$ and $(y_i \leq y_{i+1})$ and $(y_i > k_+)$ or $(y_i < y_{i-1})$ and $(y_i \leq y_{i+1})$ and $(y_i < k_-)$, wherein $k_+$ and $k_-$ are predetermined threshold values, selecting said digital detector code $d_i=1$ to indicate the occurrence of an analog signal extremum near said signal sample $S_i$; otherwise (b.3) selecting said digital detector code $d_i=0$ to indicate no occurrence of an analog signal extremum near said signal sample $S_i$.

3. The method of claim 2 wherein said producing step (c) comprises the step of:

(c.1) producing a digital clock PES $e_i = y_i * \text{sign}(y_{i+1})$ responsive to a detector code sequence $(d_{i-1}, d_i, d_{i+1}) = (1,0,1)$.

4. The method of claim 3 wherein said producing step (c) further comprises the steps of:

(c.2) setting a flag signal $F_i=1$ and storing a hold signal $H_i=y_i * \text{sign}(y_{i+1})$ responsive to a detector code sequence $(d_{i-1}, d_i, d_{i+1})=(0,0,1)$; and (c.3) producing a digital clock PES $e_i=F_{i-1}(H_{i-1}-y_i * \text{sign}(y_{i-1}))$ and resetting said hold signal $H_i=0$ and said flag signal $F_i=0$ responsive to a detector code sequence $(d_{i-1}, d_i, d_{i+1})=(1,0,0)$.

5. The method of claim 3 wherein said producing step (c) further comprises the steps of:

(c.2) setting a flag signal $F_i=1$ and storing a hold signal $H_i=y_i * \text{sign}(y_{i-1})$ responsive to a detector code sequence $(d_{i-1}, d_i, d_{i+1})=(1,0,0)$; and (c.3) producing a digital clock PES $e_i=F_{i-1}(y_i * \text{sign}(y_{i+1})-H_{i-1})$ and resetting said hold signal $H_i=0$ and said flag signal $F_i=0$ responsive to a detector code sequence $(d_{i-1}, d_i, d_{i+1})=(0,0,1)$.

6. The method of claim 3 wherein said producing step (c) further comprises the steps of:

(c.2) setting a flag signal $F_i=1$ responsive to a digital code sequence $(d_{i-1}, d_i, d_{i+1})=(0,0,1)$;

(c.3) producing a digital clock PES $e_i=F_{i-1}(y_{i-2}-y_i) * \text{sign}(y_{i-1})$ and resetting said flag signal $F_i=0$ responsive to a detector code sequence $(d_{i-1}, d_i, d_{i+1})=(1,0,0)$; and (c.4) resetting said flag signal $F_i=0$ responsive to a detector code sequence $(d_{i-1}, d_i, d_{i+1})=(1,0,1)$.

7. In a signal processing channel for recovering coded binary data from an analog signal having extrema, said channel having clock means for generating a channel clock signal and sampling means for sampling said analog signal to produce a plurality of sequential signal samples $\{S_i\}$ responsive to said channel clock signal, wherein i is an integer, a clock phase error correction circuit comprising:

converter means coupled to said sampling means and to said clock means for producing a multiplicity of digital signals $\{y_i\}$ representing said sequential samples $\{S_i\}$;

register means coupled to said converter means for storing a sequence of at least three sequential said digital signals $(y_{i-1}, y_i, y_{i-1})$;

peak detector means coupled to said register means for encoding each said sequence of digital signals to produce a digital detector code $d_i$ having one of at least two values representing whether or not an extremum occurs in said analog signal near the signal sample $S_i$ corresponding to said each digital signal $y_i$;

error means coupled to said peak detector means for producing a digital clock phase error signal (PES) $e_i$ in response to each sequence of at least three adjacent said detector codes $(d_{i-1}, d_i, d_{i+1})$; and phase adjusting means coupled to said error means and to said clock means for adjusting said channel clock signal phase responsive to said digital clock PES $e_i$.

8. The clock phase error correction circuit of claim 7 wherein said peak detector means further comprises:

peak logic means for comparing said three sequential digital signals $(y_{i-1}, y_i, y_{i+1})$ and for selecting said digital detector code $d_i$ such that, if $(y_i > y_{i-1})$ and $(y_i \geq y_{i+1})$ and $(y_i > k_+)$ or $(y_i < y_{i-1})$ and $(y_i < y_{i+1})$ and $(y_i < k_-)$, wherein $k_+$ and $k_-$ are predetermined threshold values, said digital detector code $d_i=1$ indicating the occurrence of an analog signal extremum near said signal sample $S_i$, otherwise said digital detector code $d_i=0$ indicating no occurrence of an analog signal extremum near said signal sample $S_i$.

9. The clock phase error correction circuit of claim 8 wherein said peak logic means further comprises:

first PES logic means for producing a digital clock PES $e_i=y_i * \text{sign}(y_{i+1})$ responsive to a detector code sequence $(d_{i-1}, d_i, d_{i+1})=(1,0,1)$.

10. The clock phase error correction circuit of claim 9 wherein said peak logic means further comprises:

flag means for storing a flag signal $F_i$;

hold register means for storing a hold signal $H_i$;

second PES logic means coupled to said flag means and to said hold register means for setting said flag signal $F_i=1$ and for setting said hold signal $H_i=y_i * \text{sign}(y_{i+1})$ responsive to a detector code sequence $(d_{i-1}, d_i, d_{i+1})=(0,0,1)$; and third PES logic means coupled to said second PES logic means for producing a digital clock PES $e_i=F_{i-1}(H_{i-1}-y_i * \text{sign}(y_{i-1}))$ and for resetting said hold signal $H_i=0$ and said flag signal $F_i=0$ responsive to a detector code sequence $(d_{i-1}, d_i, d_{i+1})=(1,0,0)$.

11. The clock phase error correction circuit of claim 9 wherein said peak logic means further comprises:

flag means for storing a flag signal $F_i$;

hold register means for storing a hold signal $H_i$;

second PES logic means coupled to said flag means and to said hold register means for setting said flag signal $F_i=1$ and for setting said hold signal $H_i=y_i * \text{sign}(y_{i-1})$ responsive to a detector code sequence $(d_{i-1}, d_i, d_{i+1})=(1,0,0)$; and third PES logic means coupled to said second PES logic means for producing a digital clock PES $e_i = F_{i-1}(y_i*\text{sign}(y_{i+1}) - H_{i-1})$ and for resetting said hold signal $H_i = 0$ and said flag signal $F_i = 0$ responsive to a detector code sequence $(d_{i-1}, d_i, d_{i+1}) = (0,0,1)$.

12. The clock phase error correction circuit of claim 9 wherein said peak logic means further comprises:

flag means for storing a flag signal $F_i$;

second PES logic means coupled to said flag means for setting said flag signal $F_i = 1$ responsive to a digital code sequence $(d_{i-1}, d_i, d_{i+1}) = (0,0,1)$;

third PES logic means coupled to said second PES logic means for producing a digital clock PES $e_i = F_{i-1}(y_{i-2} - y_i)*\text{sign}(y_{i-1})$ and resetting said flag signal $F_i = 0$ responsive to a detector code sequence $d_{i-1}, d_i, d_{i+1}) = (1,0,0)$; and reset means in said first PES logic means for resetting said flag signal $F_i = 0$ responsive to said detector code sequence $(d_{i-1}, d_i, d_{i+1}) = (1,0,1)$.

13. In a direct access storage device (DASD) having a processing channel for recovering coded binary data from an analog signal representing data stored as a plurality of signal transitions in said DASD, a clock phase error correction circuit comprising:

converter means coupled to said sampling means and to said clock means for producing multiplicity or digital signals $\{y_i\}$ representing said sequential samples $\{S_i\}$;

register means coupled to said converter means for storing a sequence of at least three said digital signals $(y_{i-1}, y_i, y_{i+1})$;

peak detector means coupled to said register means for encoding each said sequence of digital signals to produce a digital detector code $d_i$ having one of at least two values representing whether or not an extremum occurs in said analog signal near the signal sample $S_i$ corresponding to said each digital signal $y_i$;

error means coupled to said peak detector means for producing a digital clock phase error signal (PES) $e_i$ in response to each sequence of at least three adjacent said detector codes $(d_{i-1}, d_i, d_{i+1})$; and phase adjusting means coupled to said error means and to said clock means for adjusting said channel clock signal phase responsive to said digital clock PES $e_i$.

14. The DASD channel clock phase error correction circuit of claim 13 wherein said peak detector means further comprises:

logic means for comparing said three sequential digital signals $(y_{i-1}, y_i, y_{i+1})$ and for selecting said digital detector code $d_i$ such that, if $(y_i > y_{i-1})$ and $(y_i \geq y_{i+1})$ and $(y_i > k_+)$ or $(y_i < y_{i-1})$ and $(y_i \leq y_{i+1})$ and $(y_i < k_-)$, wherein $k_+$ and $k_-$ are predetermined threshold values, said digital detector code $d_i = 1$ indicating the occurrence of an analog signal extremum near said signal sample $S_i$, otherwise said digital detector code $d_i = 0$ indicating no occurrence of an analog signal extremum near said signal sample $S_i$.

15. The DASD channel clock phase error correction circuit of claim 14 wherein said peak logic means further comprises:

first PES logic means for producing a digital clock PES $e_i = y_i*\text{sign}(y_{i+1})$ responsive to a detector code sequence $(d_{i-1}, d_i, d_{i+1}) = (1,0,1)$.

16. The DASD channel clock phase error correction circuit of claim 15 wherein said peak logic means further comprises:

flag means for storing a flag signal $F_i$;

hold register means for storing a hold signal $H_i$;

second PES logic means coupled to said flag means and to said hold register means for setting said flag signal $F_i = 1$ and for setting said hold signal $H_i = y_i*\text{sign}(y_{i+1})$ responsive to a detector code sequence $(d_{i-1}, d_i, d_{i+1}) = (0,0,1)$; and third PES logic means coupled to said second PES logic means for producing a digital clock PES $e_i = F_{i-1}(H_{i-1} - y_i*\text{sign}(y_{i-1}))$ and for resetting said hold signal $H_i = 0$ and said flag signal $F_i = 0$ responsive to a detector code sequence $(d_{i-1}, d_i, d_{i+1}) = 1,0,0)$.

17. The DASD channel clock phase error correction circuit of claim 15 wherein said peak logic means further comprises:

flag means for storing a flag signal $F_i$;

hold register means for storing a hold signal $H_i$;

second PES logic means coupled to said flag means and to said hold register means for setting said flag signal $F_i = 1$ and for setting said hold signal $H_i = y_i*\text{sign}(y_{i-1})$ responsive to a detector code sequence $(d_{i-1}, d_i, d_{i+1}) = (1,0,0)$; and third PES logic means coupled to said second PES logic means for producing a digital clock PES $e_i = F_{i-1}(y_i*\text{sign}(y_{i+1}) - H_{i-1})$ and for resetting said hold signal $H_i = 0$ and said flag signal $F_i = 0$ responsive to a detector code sequence $(d_{i-1}, d_i, d_{i+1}) = (0,0,1)$.

18. The DASD channel clock phase error correction circuit of claim 15 wherein said peak logic means further comprises:

flag means for storing a flag signal $F_i$;

second PES logic means coupled to said flag means for setting said flag signal $F_i = 1$ responsive to a digital code sequence $(d_{i-1}, d_i, d_{i+1}) = (0,0,1)$;

third PES logic means coupled to said second PES logic means for producing a digital clock PES $e_i = F_{i-1}(y_{i-2} - y_i)*\text{sign}(y_{i-1})$ and resetting said flag signal $F_i = 0$ responsive to a detector code sequence $(d_{i-1}, d_i, d_{i+1}) = (1,0,0)$; and reset means in said first PES logic means for resetting said flag signal $F = 0$ responsive to said detector code sequence $(d_{i-1}, d_i, d_{i+1}) = (1,0,1)$.

19. In an optical data storage device having a processing channel for recovering coded binary data from an analog signal represented data stored as a plurality of signal transitions in said optical data storage device, said channel having clock means for generating a channel clock signal and sampling means for sampling said analog signal to produce a plurality of sequential signal samples $\{S_i\}$ responsive to said channel clock signal, wherein i is an integer, a clock phase error correction circuit comprising:

converter means coupled to said sampling means and to said clock means for producing a multiplicity of digital signals $\{y_i\}$ representing said sequential samples $\{S_i\}$;

register means coupled to said converter means for storing a sequence of at least three said digital signals $(y_{i-1}, y_i, y_{i+1})$;

peak detector means coupled to said register means for encoding each said sequence of digital signals to produce a digital detector code $d_i$ having one of at least two values representing whether or not an extremum occurs in said analog signal near the signal sample $S_i$ corresponding to said each digital signal $y_i$;

error means coupled to said peak detector means for producing a digital clock phase error signal (PES) $e_i$ in response to each sequence of at least three adjacent said detector codes ($d_{i-1}$, $d_i$, $d_{i+1}$); and phase adjusting means coupled to said error means and to said clock means for adjusting said channel clock signal phase responsive to said digital clock PES $e_i$.

20. The optical data storage device clock phase error correction circuit of claim 19 wherein said peak detector means further comprises:

logic means for comparing said three sequential digital signals ($y_{i-1}$, $y_i$, $y_{i+1}$) and for selecting said digital detector code $d_i$ such that, if ($y_i > y_{i-1}$) and ($y_i \geq y_{i+1}$) and ($y_i > k_+$) or ($y_i < y_{i-1}$) and ($y_i \leq y_{i+1}$) and ($y_i < k_-$), wherein $k_+$ and $k_-$ are predetermined threshold values, said digital detector code $d_i = 1$ indicating the occurrence of an analog signal extremum near said signal $S_i$, otherwise said digital detector code $d_i = 0$ indicating no occurrence of an analog signal extremum near said signal sample $S_i$.

21. The optical data storage channel clock phase error correction circuit of claim 20 wherein said peak logic means further comprises:

first PES logic means for producing a digital clock PES $e_i = y_i * \text{sign}(y_{i+1})$ responsive to a detector code sequence ($d_{i-1}$, $d_i$, $d_{i+1}$)=(1,0,1).

22. The optical data storage channel clock phase error correction circuit of claim 21 wherein said peak logic means further comprises:

flag means for storing a flag signal $F_i$;

hold register means for storing a hold signal $H_i$;

second PES logic means coupled to said flag means and to said hold register means for setting said flag signal $F_i = 1$ and for setting said hold signal $H_i = y_i * \text{sign}(y_{i+1})$ responsive to a detector code sequence ($d_{i-1}$, $d_i$, $d_{i+1}$)=(0,0,1); and third PES logic means coupled to said second PES logic means for producing a digital clock PES $e_i = F_{i-1}(H_{i-1} - y_i * \text{sign}(y_{i-1}))$ and for resetting said hold signal $H_i = 0$ and said flag signal $F_i = 0$ responsive to a detector code sequence ($d_{i-1}$, $d_i$, $d_{i+1}$)=(1,0,0).

23. The optical data storage channel clock phase error correction circuit of claim 21 wherein said peak logic means further comprises:

flag means for storing a flag signal $F_i$;

hold register means for storing a hold signal $H_i$;

second PES logic means coupled to said flag means and to said hold register means for setting said flag signal $F_i = 1$ and for setting said hold signal $H_i = y_i * \text{sign}(y_{i-1})$ responsive to a detector code sequence ($d_{i-1}$, $d_i$, $d_{i+1}$)=(1,0,0); and third PES logic means coupled to said second PES logic means for producing a digital clock PES $e_i = F_{i-1}(y_i * \text{sign}(y_{i+1}) - H_{i-1})$ and for resetting said hold signal $H_i = 0$ and said flag signal $F_i = 0$ responsive to a detector code sequence ($d_{i-1}$, $d_i$, $d_{i+1}$)=(0,0,1).

24. The optical data storage channel clock phase error correction circuit of claim 21 wherein said peak logic means further comprises:

flag means for storing a flag signal $F_i$;

second PES logic means coupled to said flag means for setting said flag signal $F_i = 1$ responsive to a digital code sequence ($d_{i-1}$, $d_i$, $d_{i+1}$)=(0,0,1);

third PES logic means coupled to said second PES logic means for producing a digital clock PES $e_i = F_{i-1}(y_{i-2} - y_i) * \text{sign}(y_{i-1})$ and resetting said flag signal $F_i = 0$ responsive to a detector code sequence ($d_{i-1}$, $d_i$, $d_{i+1}$)=(1,0,0); and reset means in said first PES logic means for resetting said flag signal $F_i = 0$ responsive to said detector code sequence ($d_{i-1}$, $d_i$, $d_{i+1}$)=(1,0,1).

* * * * *